No. 725,235. PATENTED APR. 14, 1903.
M. S. FARMER.
HOOK.
APPLICATION FILED SEPT. 18, 1902.
NO MODEL.
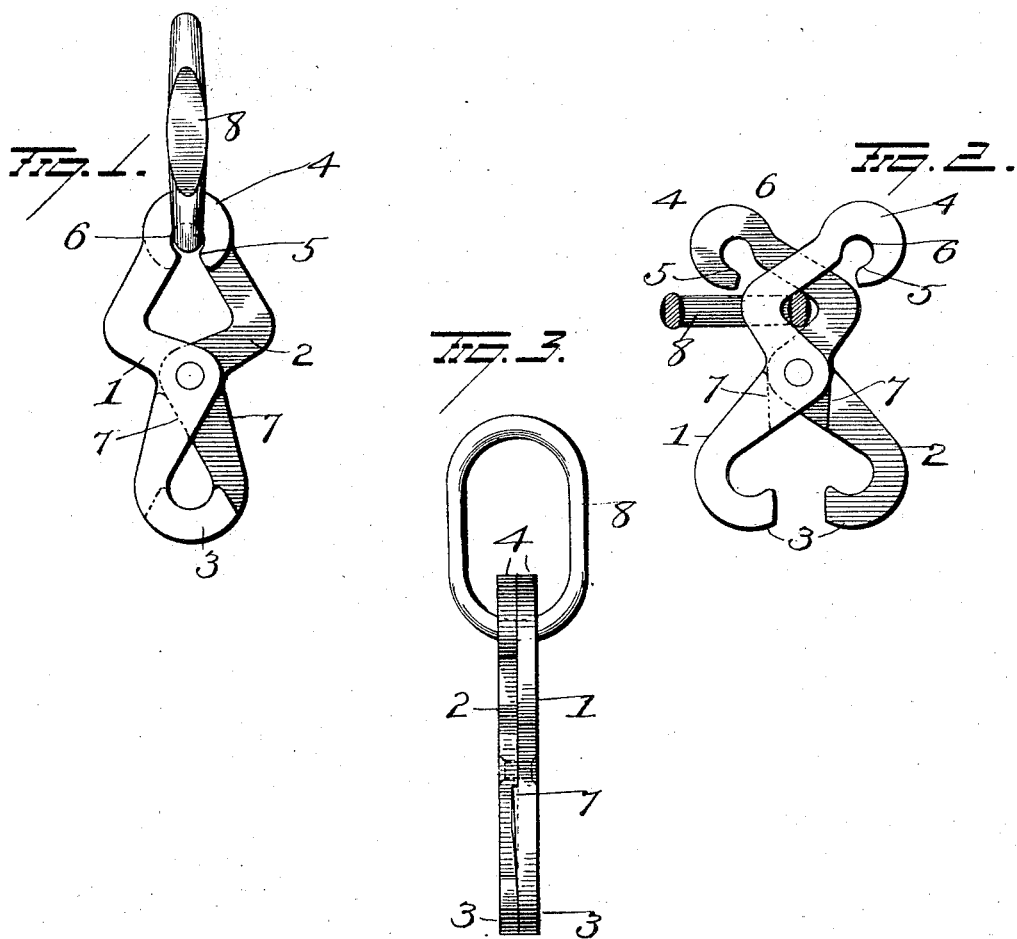
WITNESSES
INVENTOR

UNITED STATES PATENT OFFICE.

MATTHEW S. FARMER, OF WASHINGTON, DISTRICT OF COLUMBIA.

HOOK.

SPECIFICATION forming part of Letters Patent No. 725,235, dated April 14, 1903.

Application filed September 18, 1902. Serial No. 123,945. (No model.)

*To all whom it may concern:*

Be it known that I, MATTHEW S. FARMER, of Washington, in the District of Columbia, have invented certain new and useful Improvements in Hooks; and I do hereby declare the following to be a full, clear, and exact description of the invention, such as will enable others skilled in the art to which it appertains to make and use the same.

My invention relates to an improved hook, and more particularly to an improved removable connecting device, the object of the invention being to provide improvements of this character which will take the place of the ordinary snap-hook and which will dispense altogether with the employment of a spring and absolutely lock the hook in its closed position without danger of its accidental opening.

With this object in view the invention consists in certain novel features of construction and combinations and arrangements of parts, as will be more fully hereinafter described, and pointed out in the claims.

In the accompanying drawings, Figure 1 is a view illustrating my improvements. Fig. 2 is a similar view showing the hook open, and Fig. 3 is an edge view.

1 and 2 represent the two members of my improved hook, which can be cast precisely alike or stamped from the same dies. Each member is perforated near its center to receive a rivet for pivotally connecting them, and each member is made at one end in the form of a hook 3, disposed opposite to and normally overlapping the hook of the other member. The opposite end of each member is made in the form of a hook 4, and when the hooks 4 are brought together a triangular opening is formed which communicates by a contracted passage 5 with circular openings 6, formed by the hook portion 4 of the members.

8 represents a link secured to a strap or other device, and is made, preferably, of circular wire to fit the circular openings 6 and of too great a diameter to pass through passage 5, thus securely locking the members against pivotal movement. One or both sides of this link, however, are flattened to permit the link to pass through the passage 5 when it is desired to open the hook, and shoulders or stops 7 are provided on the respective hooks 3 to limit the closing movement of the hook and prevent the escape of the link.

The operation of my improvements is as follows: When the hook is closed, it is in the position shown in Fig. 1, and when it is desired to open the same the link 8 is slid around in the openings 6 until the flattened or contacted side of the link rests in the openings, when it can be moved through contracted passage 5 into the large opening formed by hook 4 and the members of the hook swung on the pivot to an open position, as shown in Fig. 2. To close and lock the hooks, the members are swung on the pivot until the shoulders 7 engage the hooks 3 and limit their further closing movement. When in this position, the hooked ends 3 will overlap and hold an article therein. The link 8 can now be turned to aline its contracted side with passage 5 and be moved therethrough into openings 6, when a movement of the link therein to bring the round portion thereof in the openings will securely lock the link therein and prevent possibility of the accidental opening of the hook.

In assembling the parts the link 8 is placed in hook 4 of one member near its pivotal point. The other member of the hook is now placed beside the first and the rivet secured in place, thus enabling the link and members of the hook to be separately made and assembled afterward.

A great many changes might be made in the general form and arrangement of the parts described without departing from my invention, and hence I do not limit myself to the precise construction set forth, but consider myself at liberty to make such slight changes and alterations as fairly fall within the spirit and scope of my invention.

Having fully described my invention, what I claim as new, and desire to secure by Letters Patent, is—

1. A hook comprising two pivoted members the attaching-arms of which are each provided with a hook which overlap one another the arms being constructed to form a space between them of greater width than the space between the overlapping hooks, and a contracted passage connecting said spaces when the hook is closed, and a link adapted to fit within the space between the overlapping hooks, and having a contracted portion which can be passed through the contracted passage, substantially as set forth.

2. A hook comprising two members pivoted together between their ends, having overlapping hooks at one end and forming an enlarged opening at their other ends, smaller openings in the members communicating by a contracted passage with the larger opening, and a locking member to fit the smaller openings and having a contracted portion to move through the passage into the larger opening and permit the hook members to swing on their pivot.

3. A hook, comprising two members pivoted together between their ends, having overlapping oppositely-disposed hooks at one end and forming an enlarged opening at their other ends, smaller openings in the ends of the members communicating by a contracted passage with the large opening, a locking-link to fit the smaller openings and having a contracted portion to move through the contracted passage into the large opening to permit the hooks to separate, and a stop on one member to limit the closing movement of both members.

In testimony whereof I have signed this specification in the presence of two subscribing witnesses.

MATTHEW S. FARMER.

Witnesses:
S. W. FOSTER,
R. S. FERGUSON.